United States Patent [19]

Shiba et al.

[11] Patent Number: 5,247,416
[45] Date of Patent: Sep. 21, 1993

[54] DISK CARTRIDGE WITH FRICTION-REDUCING SHEET

[75] Inventors: Haruo Shiba, Komoro; Morimasa Sasaki; Masaru Ikebe, both of Saku, all of Japan

[73] Assignee: TDK Corporation, Tokyo, Japan

[21] Appl. No.: 769,400

[22] Filed: Oct. 1, 1991

[30] Foreign Application Priority Data

Oct. 2, 1990 [JP] Japan ............................ 2-103347[U]

[51] Int. Cl.$^5$ ............................................. G11B 23/03
[52] U.S. Cl. ...................................... 360/133; 369/291
[58] Field of Search ........................... 360/133; 369/291

[56] References Cited

U.S. PATENT DOCUMENTS

| | | | |
|---|---|---|---|
| 4,695,911 | 9/1987 | Loosen | 360/133 |
| 4,779,158 | 10/1988 | Tanaka et al. | 360/13 |
| 5,103,363 | 4/1992 | Yamada et al. | 360/133 |
| 5,153,801 | 10/1992 | Ikebe et al. | 360/133 |
| 5,161,080 | 11/1992 | Funayama et al. | 360/133 |

FOREIGN PATENT DOCUMENTS 61-616183  4/1986  Japan .
61-105972  7/1986  Japan .
61-182921  11/1986  Japan .

Primary Examiner—Edward P. Westin
Assistant Examiner—John R. Lee
Attorney, Agent, or Firm—Price, Gess & Ubell

[57] ABSTRACT

A disk cartridge includes a casing accommodating a disk for rotation therein and including a center aperture and at least one access window, and interlocked shutters for opening and closing the center aperture and the access window. A lubricating member is interposed between the casing and the shutter for preventing the shutter from direct contact with the casing.

12 Claims, 4 Drawing Sheets

DISK CARTRIDGE WITH FRICTION-REDUCING SHEET

CROSS-REFERENCE TO THE RELATED APPLICATION

Reference is made to Ikebe, Sasaki, Shiba and Hashizume, copending application Ser. No. 705,022 filed May 22, 1991, for "Disk Cartridge".

This invention relates to a disk cartridge having a hard disk, especially an optical disk accommodated in a casing.

BACKGROUND OF THE INVENTION

Compact disks (CD) and video disks (LD) as information recording media are often available in the form of disk cartridges having the disks accommodated in casings whereupon recording/reproducing machines such as disk players are loaded with the cartridges. The disk players have a drive shaft for driving the disk and a pickup for recording and reproducing bits of information into and from the disk.

To protect these disks against deposition of dust and debris, damages during handling, and temperature influence, the disks are conventionally enclosed in casings. Each casing includes a center aperture located generally at the center of the casing for allowing the drive shaft to extend therethrough to engage the disk annular hub for driving and an access window located radially outward of the center aperture for allowing a pickup to make access to the disk therethrough for recording and reproducing when the disk player is loaded with the cartridge. The casing further includes movable shutters for normally closing the windows when the disk is not used.

For recording or reproducing numerous data for an instant in an optical disk or the like, a plurality of pickups are required and the casing must then be provided with a plurality of access windows through which the pickups can make access to the disk. The shutters are thus required to simultaneously open or close the center and access windows during loaded and unloaded periods of the disk for the purpose of protecting the disk against dust and debris. Various types of shutters have been proposed for simultaneously opening and closing these windows.

Since the shutter is disposed in close proximity to the casing wall, the shutter can contact and rub the casing wall during its operation. In the case of a relatively large shutter for opening and closing a plurality of access windows, a relatively large available contact surface area leads to a relatively large frictional force which in turn, requires a greater force to actuate the shutter for opening and closing. Consequently, several inconvenient problems will arise. The power consumption on the disk drive side for actuating the shutter will be increased. In the case of a disk cartridge designed so as to automatically close the shutter when the cartridge is removed from the disk drive, the automatic shutter closing operation will be less smooth. Additionally, since the shutter can rub and scrape the resinous casing wall, resin chips will scatter within the casing and build up on the disk, providing a potential error source.

SUMMARY OF THE INVENTION

Therefore, an object of the present invention is to provide an improved disk cartridge capable of smoothly operating the shutter for opening and closing without substantial frictional contact with the casing wall. Another object of the present invention is to provide an improved disk cartridge capable of minimizing generation of resin particles by the shutter, thereby eliminating one of potential error sources.

The present invention is directed to a disk cartridge adapted to be loaded in a disk drive having a drive shaft, comprising a casing of resin accommodating a disk for rotation therein and including a center aperture for inserting the drive shaft and at least one access window, and shutter means of metal for opening and closing the center aperture and the access window. A lubricating sheet, preferably of polyethylene, is interposed between the casing and the shutter means for minimizing frictional wear.

DESCRIPTION OF THE PREFERRED EMBODIMENTS

Figure 1:
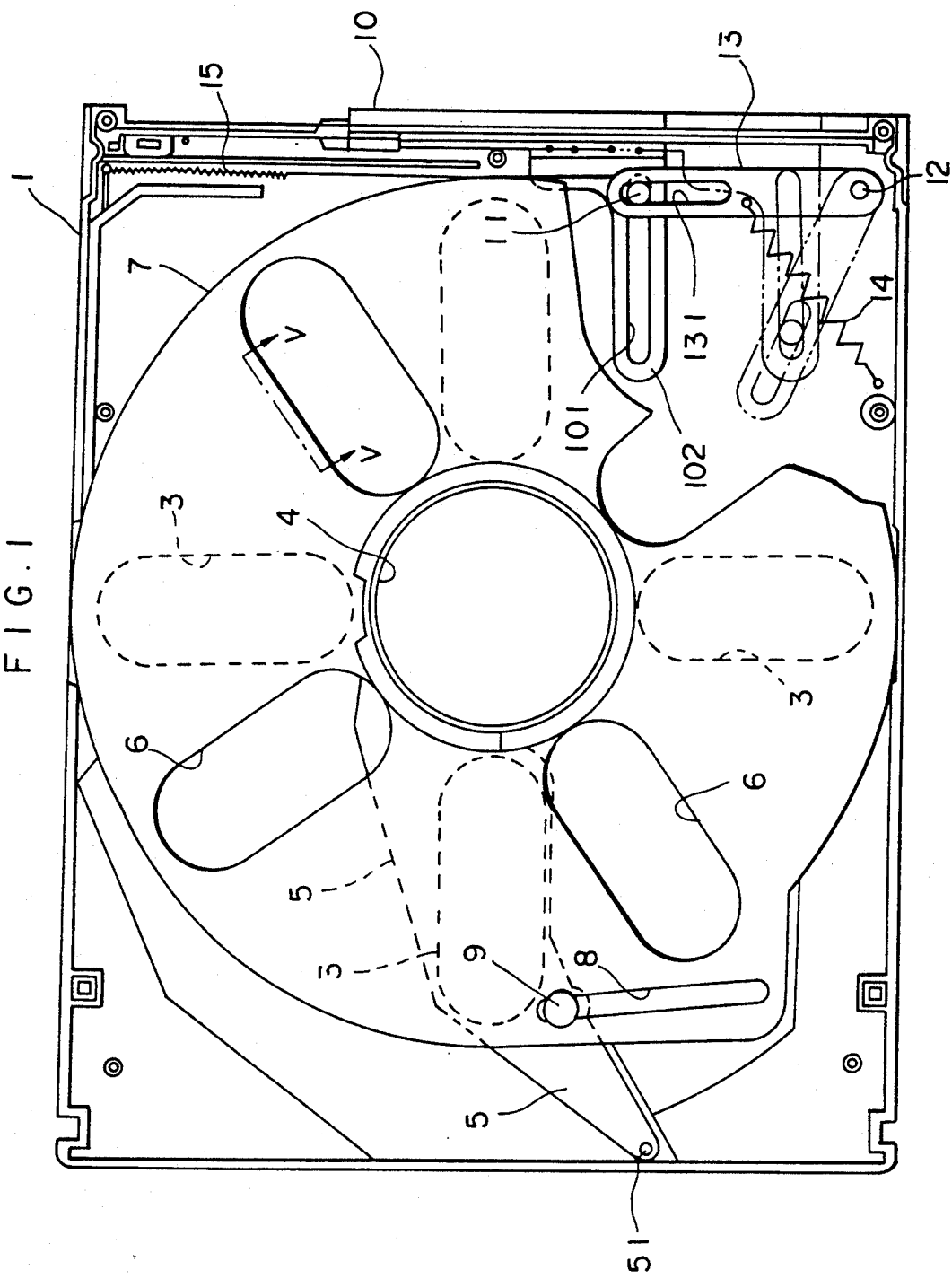
FIG. 1 is a plane view of a disk cartridge according to one embodiment of the invention showing a casing lower half, with shutter members in a closed position.
Figure 2:
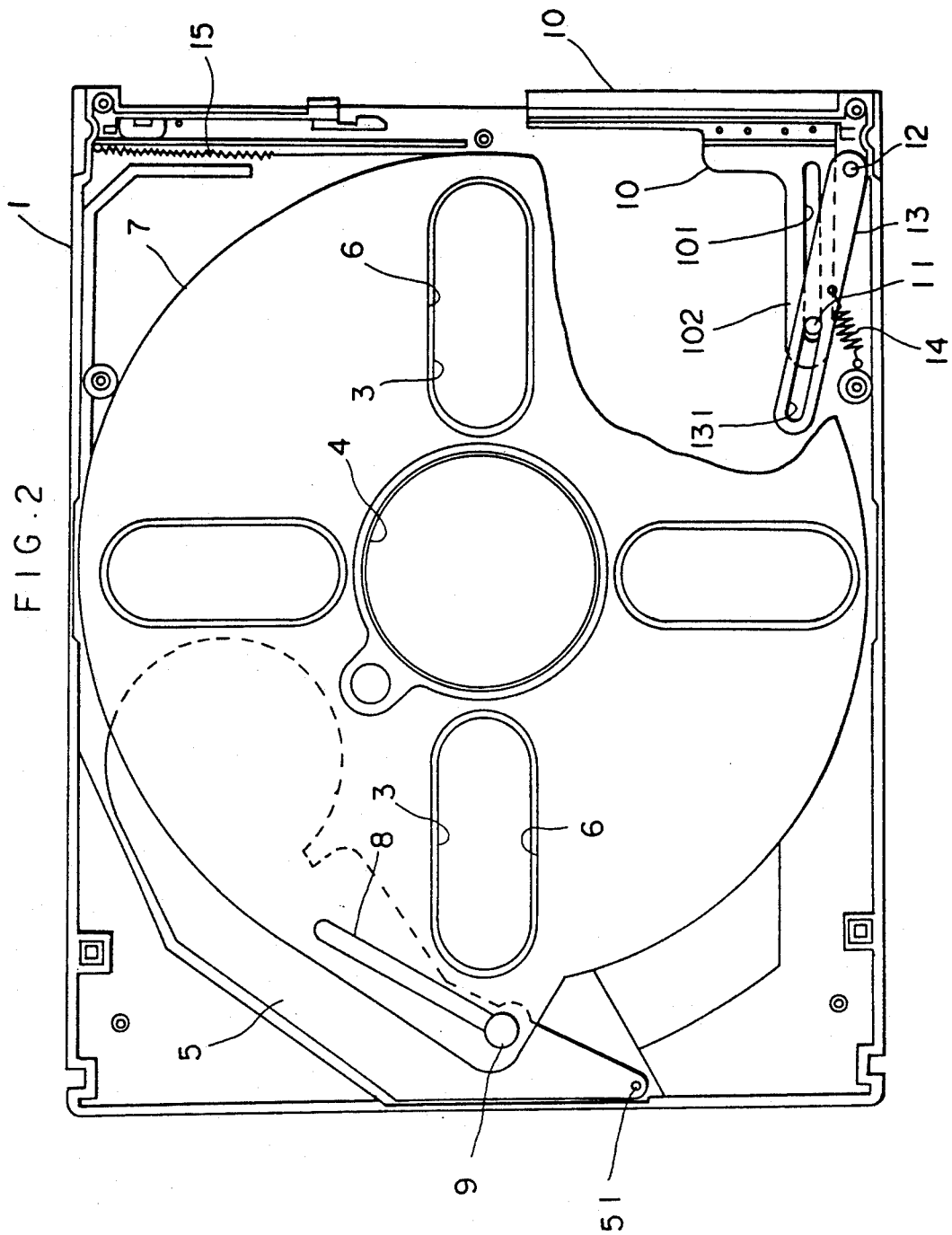
FIG. 2 is a plane view of the same cartridge casing as FIG. 1, with shutter members in an open position.
Figure 3:
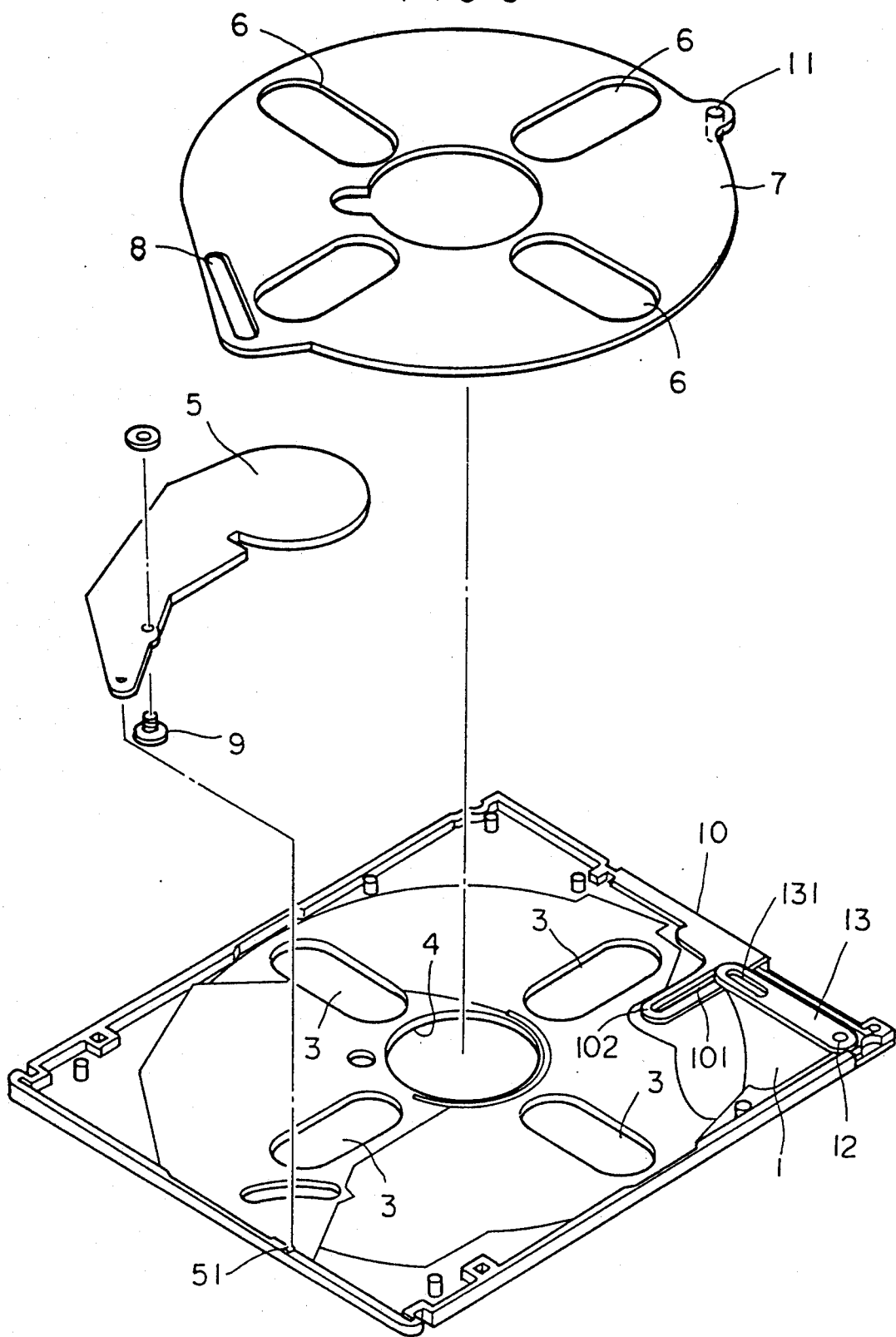
FIG. 3 is an exploded perspective view of the cartridge shown in FIG. 1.

Referring to FIGS. 1 to 3, there is illustrated a disk cartridge comprising a generally rectangular casing consisting of a pair of upper and lower halves. The casing accommodates a disk (shown at 2 in FIG. 5) for rotation about a center therein. The disk cartridge is adapted to be loaded in a disk drive having a drive shaft, a plurality of pickups, and a shutter actuating member although these disk drive members are not shown in the figures. In the plan views of FIGS. 1 and 2, only the casing lower half designated at 1, particularly its inside surface is shown with the casing upper half removed. If the disk is double sided, the casing upper half is substantially the same as the lower half.

The casing (lower half) 1 includes a circular center aperture 4 disposed generally at the center of the casing coincide with the disk center for allowing the drive shaft to extend therethrough to engage the disk center hub for driving. The casing 1 also includes a plurality of, four in the illustrated embodiment, access windows 3 disposed radially outward of the center aperture 4 for allowing the pickups to make access to the disk for recording and reproducing. Preferably the access windows 3 are equiangularly distributed about the casing center and race track-shaped with their major axis in radial alignment with the casing center. The casing is often made of a resin material, for example, ABS resin and polycarbonate.

Shutter means is provided for opening and closing the center aperture and the access windows. The shutter means includes a rotary shutter member 7 mounted coaxially about the center aperture 4 for rotation and having a plurality of openings 6 at positions corresponding to the plurality of access windows 3, and a pivotal shutter member 5 mounted at a position 51 spaced from the center aperture 4 for pivotal motion for opening and closing the center aperture 4. The shutter members are often made of a metal, for example, steel (e.g., SUS 304) and aluminum and a resin such as POM and PP optionally metallized on the surface with nickel and chromium.

More particularly, the rotary shutter member 7 is an annular member having a radially inner edge rotatably mounted about a central annular rim of the casing defining the center aperture 4. The annular shutter member 7 is provided with four openings 6 which are equiangularly spaced and track-shaped as are the access windows 3. The pivotal shutter member 5 is a configured arm having one end mounted for pivotal motion to the casing 1 by a pin 51 which is spaced from the center aperture 4 and located outside the confine of the annular shutter member 7, e.g., near the left side of the casing 1 in the illustrated embodiment. The arm 5 has a free distal portion which is circular having approximately the same diameter as the center aperture 4. The rotary and pivotal shutter members 7 and 5 are partially overlapped as viewed in an axial direction. The rotary shutter member 7 overlies the pivotal shutter member 5 on the casing lower half 1 in the illustrated embodiment. Also included is means for interlocking the rotary and pivotal shutter members 7 and 5. The rotary shutter member 7 is provided with a guide slot 8. A pin 9 is fixedly joined to the pivotal shutter member 5 and received in the guide slot 8 for linear motion. This interlocking means is exemplary and the guide slot and pin may be provided inversely. Any desired interlocking mechanisms may be used insofar as the rotary and pivotal shutter members 7 and 5 are cooperatively brought into the closed or open positions at the same time.

Also provided is means for selectively actuating the shutter means. A slide member 10 is disposed in the casing 1 for slidable motion in cooperative engagement with the rotary shutter member 7. The slide member 10 is adapted to be slid by the shutter actuating member when the disk player is loaded with the disk cartridge. More particularly, the slide member 10 is fitted over one edge (right edge in FIGS. 1-2) of the casing 1 for linear slidable motion and biased (upward in FIGS. 1-2) by a spring 15 toward the shutter closing direction. In order for the shutter member 7 to cooperate with the slide member 10, the shutter member 7 is provided with a pin 11 at the periphery. The slide member 10 includes an arm 102 extending perpendicularly to the slide member 10 and having a slot 101 formed therein. A swing lever 13 having a slot 131 formed therein is mounted for pivotal motion to the casing 1 by a pin 12 and biased by a spring 14 toward the shutter opening direction. The shutter member pin 11 is received in both the slide member arm slot 101 and the lever slot 131 for free motion. The biasing force of the spring 15 is greater than that of the spring 14 so that the entire arrangement normally assumes the closing position as shown in FIG. 1.

Lubricating means, preferably a pad of high molecular weight polyethylene, is interposed between the casing wall and the shutter member. The lubricating pad should preferably cover the area where the shutter member moves. A polyethylene pad may be fixedly attached or adhesively bonded to the opposed surface of the casing wall 1 or the rotary shutter member 7. The lubricating pad may be made of low frictional resin materials, for example, polyethylene and polyethylene terephthalate.

Figure 4:
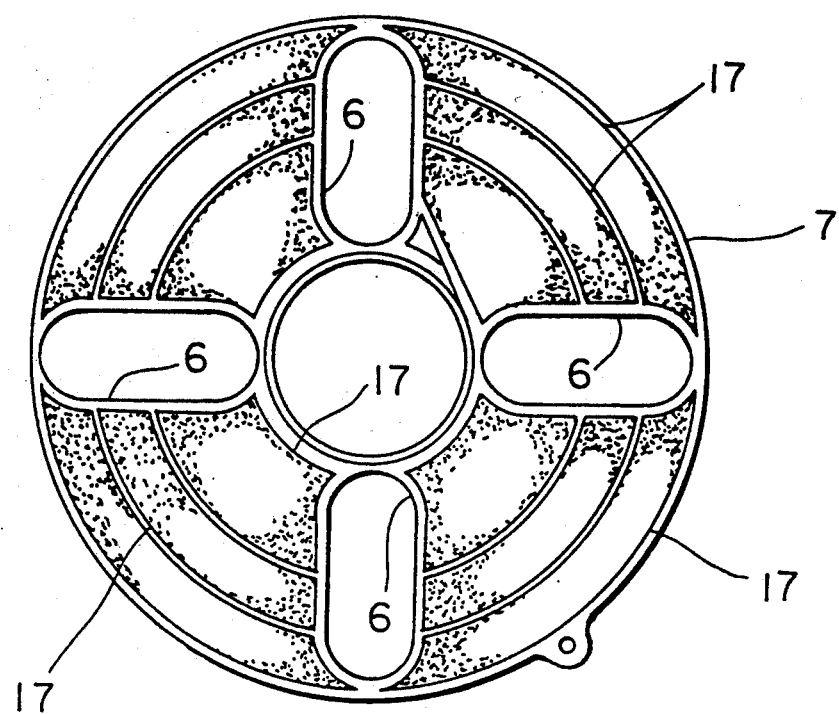
FIG. 4 is a plan view of the lower side of the shutter member in the cartridge of FIG. 1.
Figure 5:
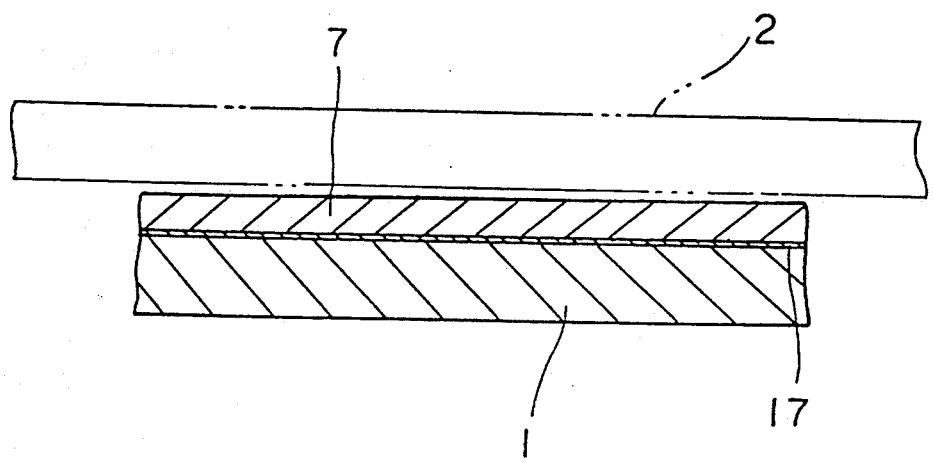
FIG. 5 is an enlarged cross section taken along lines V—V in FIG. 1 showing a lubricating pad between the shutter and the casing.

In one embodiment, the polyethylene pad 17 is fixedly attached or adhesively bonded to the rotary shutter member 7 as shown in FIG. 5 except the openings 6 and other selected areas. More particularly, as shown in FIG. 4 which is a lower side view of the rotary shutter member 7, the lubricating pad is a network of polyethylene ribs, for example, a generally annular network including four track-shaped ribs connected by four concentric ribs. Such a network is attached to the shutter member by adhesively bonding the ribs so that the ribs circumscribe the center opening and the access openings 6. An annular sheet having ribs raised in such a network pattern is also useful.

The lubricating pad need not be adhesively bonded. For example, it may be fixedly attached to the casing wall in a tight fit manner. The provision of some raised portions and rims around the holes enables such close fit attachment.

Though not shown, a lubricating pad is also interposed between the pivotal shutter member 5 and the casing 1. To this end, a separate pad may be used. An integral lubricating pad is obtained by modifying a generally circular pad as shown in FIG. 4 to a contour extending over the shutter member 5 (as seen from FIG. 2) and attaching it to the casing. No lubricating pad is necessary between the shutter members 5 and 7.

In a preferred embodiment, the pivotal shutter member 5 is configured such that it is cleared off from any access windows 3 in its retracted position (FIG. 2). If desired, the pivotal shutter member 5 may be provided with an opening for opening one of the access windows 3 when aligned. The pivotal and rotary shutter members 5 and 7 are interlocked through the pin-slot engagement 8, 9 as previously described. Broadly stated, one shutter member is provided with a projection and the other shutter member is provided with a recess or opening and they are interlocked through the projection-recess engagement. It is also possible to directly engage the shutter members 5 and 7 for interlocking or to interpose an additional slider between the shutter members 5 and 7. Understandably, the interlocking means is not limited to the illustrated and exemplified ones.

Though not shown, the pivotal shutter member 5 may be provided with a spring of normally imparting recovery force to the member 5 toward the closing position. That is, the pivotal shutter member 5 is biased in the closing direction.

It is described how the disk cartridge operates.

Normally, the disk cartridge assumes the position shown in FIG. 1 wherein the rotary shutter member 7 is biased such that the openings 6 are offset from the access windows 3, that is, the access windows 3 are closed with the shutter member 7, and the pivotal shutter member 5 is biased to close the center aperture 4.

Now, the disk player is loaded with the disk cartridge whereupon the shutter actuating member (not shown) comes in contact with the slide member 10 to urge the member 10 downward against the spring 15 from the position of FIG. 1 to the position of FIG. 2. The slide member 10 together with its slotted arm 102 is moved to the lowermost position with the aid of lever 13 and spring 14. Through the pin-slot engagement 11-101-131, the rotary shutter member 7 rotates clockwise from FIG. 1 to FIG. 2 about the center aperture 4 until the openings 6 are aligned with the access windows 3 as shown in FIG. 2, thus opening the access windows 3. Cooperatively, the pivotal shutter member 5 is rotated counterclockwise from FIG. 1 to FIG. 2 through the interlocking mechanism 8, 9, leaving the center aperture 4 open. The position where both the access windows 3 and center aperture 4 are open is shown in FIG. 2.

With the cartridge removed from the disk drive, the biasing spring 15 acts to pull back the slide member 10 toward the closing direction and to rotate the shutter members 7 and 5 toward the closing direction. Then the openings 6 are offset from the access windows 3, that is, the access windows 3 are closed with the shutter member 7, and the pivotal shutter member 5 is biased clockwise to close the center aperture 4 as shown in FIG. 1.

During rotation of the rotary shutter member 7, it does not directly contact the casing wall 1 since the lubricating pad 17 intervenes therebetween. There is no risk of the rotary shutter member 7 rubbing or scraping the opposed casing wall.

There has been described a disk cartridge comprising a casing accommodating a disk for rotation therein and including a center aperture and a plurality of access windows, shutter means for opening and closing the center aperture and the access windows, and means interposed between the casing and the shutter means for preventing direct contact therebetween whereby the shutter can be operated for opening and closing the windows without contact with the casing. Substantially reduced friction allows the shutter to be operated with a less force, resulting in a reduced power consumption on the drive side for actuating the shutter and a reduced size of such actuating mechanism. The lubricating means prevents the rotating shutter from rubbing and scraping the resin casing, avoiding any influence on the disk at its recording surface due to scattering of resin fragments. Therefore, a relatively large shutter can be smoothly operated with relatively light force for opening a plurality of windows and will smoothly resume the closing position with a moderate biasing force. The disk is maintained safe or unchanged, and protected against any influence to its recording surface(s) for an extended period of time. The arrangement incorporated in the cartridge is simple and less expensive. The cartridge is easy to handle.

While there has been described herein what is considered to be a preferred embodiment of the present invention, other modifications of the invention shall be apparent to those skilled in the art from the teachings herein. It is, therefore, desired to be secured in the appended claims all such modifications as fall within the true spirit and scope of the invention.

We claim:

1. A disk cartridge adapted to be loaded in a disk drive having a drive shaft, comprising
    a casing accommodating a disk for rotation therein and including a center aperture for inserting the drive shaft and at least one access window,
    shutter means for opening and closing the center aperture and the access window, and
    lubricating means interposed between the casing and the shutter means.

2. The disk cartridge of claim 1 wherein said lubricating means is a sheet of polyethylene or polyethylene terephthalate.

3. The disk cartridge of claim 2 wherein said lubricating sheet is of a generally annular shape coextensive with the disk and having holes corresponding to the center aperture and the access windows.

4. The disk cartridge of claim 2 wherein said lubricating sheet is fixedly attached to the surface of the casing opposed to the shutter means.

5. The disk cartridge of claim 2 wherein said lubricating sheet is fixedly attached to the surface of the shutter means opposed to the casing.

6. The disk cartridge of claim 3 wherein said lubricating sheet is adhesively bonded to the surface of the shutter means opposed to the casing along the periphery of its openings.

7. A disk cartridge adapted to be loaded in a disk drive having a drive shaft, comprising:
    a casing accommodating a disk for rotation therein and including a center aperture for inserting the drive shaft and at least one access window;
    shutter means for opening and closing the center aperture and the access window, and
    lubricating means interposed between the casing and the shutter means, including a plurality of annular ribs.

8. The disk cartridge of claim 7 wherein the access window extends radially across and interrupts the annular ribs.

9. The disk cartridge of claim 8 wherein the annular ribs are integral with a sheet of a polyethylene resin.

10. A disk cartridge adapted to be loaded in a disk drive having a drive shaft, comprising:
    a casing accommodating a disk for rotation therein and including a center aperture for inserting the drive shaft and at least one access window;
    shutter means for opening and closing the center aperture and the access window, including a shutter member and a spring for biasing the shutter member to a closed position, and
    lubricating means interposed between the casing and the shutter, including a lubricating thin plastic sheet fixed to one of the shutter and casing.

11. The disk cartridge of claim 10 wherein said lubricating means is a sheet of polyethylene or polyethylene terephthalate.

12. The disk cartridge of claim 11 wherein said lubricating sheet is of a generally annular shape coextensive with the disk and having holes corresponding to the center aperture and the access windows.

* * * * *